2,921,957

PROCESS FOR THE PRODUCTION OF FLUOROESTERS

Jacques G. O'Rear, Prince Georges County, near Camp Springs, Md., and Philip D. Faurote, Anaheim, Calif., assignors to the United States of America as represented by the Secretary of the Navy No Drawing. Application September 16, 1957
Serial No. 684,379

2 Claims. (Cl. 260—485)

(Granted under Title 35, U.S. Code (1952), sec. 266)

The invention described herein may be manufactured and used by or for the Government of the United States of America for governmental purposes without the payment of any royalties thereon or therefor.

This invention relates to the esterification of fluoroalcohols with hydrocarbon carboxylic acids, more particularly to a process for the production of fluoroesters of high purity.

Esters derived from omega-hydroperfluoroalkylcarbinols and omega-fluoro-perfluoroalkylcarbinols and hydrocarbon carboxylic acids are of interest for a variety of applications because of the exceptional stability of the molecule to oxidation, hydrolysis and pyrolysis. They are lubricants and dielectrics. As dielectrics those esters are to be preferred which are derived from fluoroalcohols of the formula $H(CF)_nCH_2OH$ where $n$ is an integer from 4 to 8 and of the formula $F(CF_2)_nCH_2OH$ where $n$ is an integer from 3 to 7 and alkane polycarboxylic acids, preferably the alkane di- and tribasic acids, and especially those which have a straight chain 3 carbon atom alkylene group between a pair of carboxylic acid groups of which methyl glutaric acid is a particularly valuable member.

Esters have been heretofore prepared from fluoroalcohols of the above classes and a variety of hydrocarbon carboxylic acids by direct esterification using p-toluenesulfonic acid as catalyst. The process is not satisfactory, being relatively slow and posing a purification problem. Removal of the by-product fluoroalkyl-p-toluenesulfonates (tosylates) formed in direct esterifications from the desired esters (fluoroalkyl carboxylates) is unusually difficult due to their high boiling points and unexpected resistance to pyrolysis and hydrolysis. The tosylate, bis (1H, 1H, 7H-dodecafluoroheptyl-p-toluenesulfonate), for example, distills at 290°–300° C. and 760 mm. with slight decomposition and is hydrolyzed only about 5% after 24 hours under reflux with a stoichiometric quantity of 10% sodium hydroxide solution. Repeated distillations at reduced pressure are required to remove the tosylates from the desired carboxylates.

Methanesulfonic acid and ethanesulfonic acid offer little by way of improvement over p-toluenesulfonic acid as catalysts for the direct esterification of fluoroalcohols of the above classes with hydrocarbon carboxylic acids. While studies indicate gains in speed to be obtainable with them over p-toluenesulfonic acid, they present a like problem in the removal of the by-product fluoroalkyl alkanesulfonates from the desired esters. In contrast, the alkyl alkanesulfonates, like the alkyl-p-toluenesulfonates, readily undergo alkaline hydrolysis.

It is a principal object of the present invention to provide a process in which fluoroalcohols of the above classes are directly esterified with hydrocarbon carboxylic acids at an accelerated rate and in which the product carboxylate esters are recovered in a highly pure form in a facile manner.

The above and other objects can be accomplished by the process of our invention which comprises conducting the esterification of fluoroalcohols of the above classes with hydrocarbon carboxylic acids in the presence of sulfuric acid as catalyst and a liquid chloroalkane as solvent which forms an azeotrope with the water of the reaction, removing the water of reaction by azeotropic distillation, subjecting the carboxylate ester and by-product sulfuric acid ester to alkaline hydrolysis and recovering the carboxylate ester by distillation under reduced pressure. A single distillation will suffice to recover fluoroalkylcarboxylate esters of a singularly high purity.

The chloroalkane employed as solvent for the fluoroalcohol should be of lower boiling point than the fluoroalcohol to be esterified and immiscible with water. Chloroalkanes suitable as solvents in the process are, for example, chloroform, carbon tetrachloride, ethylene dichloride, 1,2-dichloropropane, trichloroethylene, pentachloroethane, etc. The chloroalkanes are resistant to sulfonation under the conditions of the esterification reaction and thereby insure greater purity in the carboxylate esters. They may be used in varying amounts in the process provided that sufficient is present to insure removal of all of the water of the esterification reaction by way of azeotropic distillation, following known practice in esterification processes.

The esterification reaction may be carried out in accordance with known procedure, employing conventional apparatus which includes a reaction vessel or still provided with a distillation column for refluxing and a separator or water trap for receiving the overhead and separating the distilled water and chloroalkane solvent. The separator is provided with a conduit for return of the solvent to the reaction vessel by way of the reflux column. The mixture of the fluoroalcohol, hydrocarbon carboxylic acid, sulfuric acid and chloralkane is heated under reflux until water is no longer received in the separator. The fluoroalcohol is used in an amount slightly in excess of the theoretical required for esterification of all of the carboxylic acid groups present in accordance with known practice. Concentrated sulfuric acid is used as the catalyst in the esterification and is present in small amount, from about 0.5 to 5%, generally about 1%, based on the weight of the fluoroalcohol employed.

The esterilcation reaction is productive of two classes of esters, the desired fluoroalkylcarboxylates and by-product fluoroalkylsulfates. The latter, as we have found, unlike the corresponding p-toluene-, methane- and ethane fluoroalkylsulfonates, can be readily hydrolyzed in dilute aqueous alkaline medium, for example, in dilute aqueous potassium carbonate of about 5% concentration or in about 0.5 N aqueous sodium or potassium hydroxide solution. The hydrolysis may be carried out by washing the reaction mixture from the esterification with aqueous alkali solution at about room temperature for a short period of time. The fluoroalklyl sulfate ester is split by the hydrolysis with regeneration of the starting fluoroalcohol and the formation of the alkali metal sulfate. If desired the reaction mixture from the esterification may be first washed with water before the hydrolysis to remove free sulfuric acid present. The reaction mixture from the hydrolysis may be washed with water prior to the distillation step to remove the alkali metal sulfate. Where the product fluoroalkyl carboxylate ester tends to be less stable to alkaline hydrolysis, as in the case of the carboxylates of the lower fluoroalcohols, e.g., those having from 2 to 3 fluorocarbon groups in the molecule, the mixture of fluoroesters are taken up in ether from the esterification reaction mixture before subjecting them to the alkaline hydrolysis. While it is especially advantageous to practice this step with the carboxylates of the lower fluoroalcohols to insure against reaction between them and caustic alkali in the hydrolysis, it may be practiced as a general procedure for all of the fluoroalkylcarboxylates prior to hydrolysis with aqueous caustic solution.

In a preferred procedure, the reaction mixture from the hydrolysis is washed with water and dried before subjecting it to distillation under reduced pressure to obtain the fluoroalkyl carboxylate. Drying of the washed product of the hydrolysis may be done in known way, such as over anhydrous sodium sulfate. The drying step may be omitted if desired.

The process of our invention is illustrated in more detail by the following specific examples of its application. Parts are by weight unless otherwise noted. The process was carried out in conventional esterification apparatus of the type mentioned above.

*Example 1*

A charge of 13.2 parts (0.10 mole) of glutaric acid, 58 parts (0.25 mole) 1H, 1H, 5H-octafluoropentanol-1, 1 part conc. sulfuric acid and 100 volumes carbon tetrachloride was heated under reflux for 7 hours with removal of 3.6 parts of water from the reaction. The reaction mixture from the esterification was washed successively with water and 5% aqueous potassium carbonate solution and distilled under reduced pressure to give 45.5 parts (81.3% yield) of bis (1H, 1H, 5H-octafluoropentyl)glutarate of B.P. 128° C./0.7 mm. and $n_D^{20}$ 1.3563.

*Example 2*

A charge of 16.6 parts (0.10 mole) phthalic acid, 58 parts (0.25 mole) 1H, 1H, 5H-octafluoropentanol-1, 1 part conc. sulfuric acid and 100 volumes carbon tetrachloride was heated under reflux for 23 hours with removal of 3.7 parts of water. Worked up as in Example I, the reaction mixture gave 55.7 parts (93.8% yield) of bis (1H, 1H, 5H-octafluoropentyl) phthalate; $n_D^{20}$ 1.3990.

*Example 3*

Following the procedure of the previous examples and employing 0.15 mole tricarballyic acid to 0.55 mole of the fluoroalcohol, the tris (1H, 1H, 5H-octafluoropentyl) tricarballylate was obtained in 74.8% yield.

*Example 4*

A charge of 0.20 mole 3-methylglutaric acid, 0.45 mole 1H, 1H, 3H-tetrafluoropropanol-1, 1 part conc. sulfuric acid and 100 volumes chloroform was refluxed for 28 hours with removal of 8 parts water. Worked up as the preceding examples, the reaction mixture gave a yield of 64% of bis (1H, 1H, 3H-tetrafluoropropyl)-3-methylglutarate. Using an equi-volume mixture of carbon tetrachloride and chloroform as the solvent, the yield of the 3-methylglutarate ester was 79%.

*Example 5*

A charge of 0.20 mole 3-methylglutaric acid, 0.50 mole 1H, 1H, 7H-dodecafluoroheptanol-1, 2 parts conc. sulfuric acid and 100 volumes dichloroethane was refluxed for 24 hours with stirring. 7.2 parts water were removed. Worked up as in the preceding examples, the reaction mixture gave a yield of 90.5% of bis (1H, 1H, 7H-dodecafluoroheptyl)-3-methylglutarate. Using 2.60 moles of the dibasic acid with 5.50 moles of the fluoroalcohol and 5 parts conc. sulfuric acid and refluxing 40 hours with stirring, the yield of the 3-methylglutarate ester was 93%.

*Example 6*

A charge of 0.10 mole 3-methylglutaric acid, 0.25 mole 1H, 1H-heptafluorobutanol-1, 1 part conc. sulfuric acid and 100 volumes of an equi-volume mixture of chloroform and carbon tetrachloride was heated to reflux for 40 hours with 3.8 parts of water removed. On working up the reaction mixture as in the previous examples, bis (1H, 1H-heptafluorobutyl)-3-methylglutarate was obtained in 60% yield.

*Example 7*

Proceeding as in Example 6, but employing 1H, 1H-tetradecafluorooctanol-1 as the starting omega-fluoroperfluoroalkyl carbinol and chloroform as the solvent and heating under reflux for 16 hours, a yield of 71% of bis (1H, 1H-tetradecafluorooctyl)-3-methylglutarate was obtained.

In the manner of the above examples the various other fluoroalcohols of the above classes can be esterified with hydrocarbon carboxylic acids. The monoester, 1H, 1H, 9H-hexadeca fluorononyl-2-ethylhexanoate, for example, is prepared from 2-ethylhexanoic acid and 1H, 1H, 9H-hexadecafluorononanol-1, and the tetraester, tetrakis (1H, 1H, 5H-octafluoropentyl)-1, 2, 3, 4-butanetetracarboxylate from 1, 2, 3, 4-butane tetracarboxylic acid and 1H, 1H, 5H-octafluoropentanol-1.

Since various changes may be made in the practice of the invention without departing from the spirit or scope thereof, it is not intended that specific embodiments of the invention appearing in the above description shall be taken as limiting except as may be required by the appended claims.

What is claimed is:

1. A process for producing fluoroalkyl carboxylates in a highly pure form which comprises conducting the direct esterification of an omega-hydroperfluoroalkylcarbinol of the general formula $H(CF_2)_nCH_2OH$ where $n$ is an integer from 4 to 8 with an alkane polycarboxylic acid having an alkylene group of from 3 to 4 carbon atoms and from 2 to 3 carboxylic acid groups by heating the reactants to reflux in the presence of a small amount of sulfuric acid as catalyst and a water-immiscible liquid chloroalkane which is a solvent for and of lower boiling point than the fluoroalcohol to be esterified, said liquid chloroalkane forming an azeotrope with water and being present in amount sufficient to carry off the water from the reaction, azeotropically distilling off the water of reaction as it is formed, washing the reaction mixture from the esterification with aqueous alkali and then with water, and distilling the fluorocarboxylate from the residue under reduced pressure.

2. A process for producing fluoroalkyl carboxylates in a highly pure form which comprises conducting the direct esterification of an omega-hydroperfluoroalkylcarbinol of the general formula $H(CF_2)_nCH_2OH$ wherein $n$ is an integer from 4 to 8 with 3-methylglutaric acid by heating the reactants to reflux in the presence of a small amount of sulfuric acid as catalyst and a water-immiscible liquid chloroalkane which is a solvent for and of lower boiling point than the fluoroalcohol to be esterified, said liquid chloroalkane forming an azeotrope with water and being present in amount sufficient to carry off the water from the esterification reaction, azeotropically distilling off the water of reaction as it is formed, washing the reaction mixture from the esterification with aqueous alkali and then with water, and distilling the 3-methylglutarate ester from the residue under reduced pressure.

References Cited in the file of this patent

UNITED STATES PATENTS

| | | |
|---|---|---|
| 2,302,743 | Carruthers et al. | Nov. 24, 1942 |
| 2,628,249 | Bruno | Feb. 10, 1953 |
| 2,628,958 | Bittles | Feb. 17, 1953 |

OTHER REFERENCES

Faurote et al.: Ind. and Eng. Chem., pp. 189–191, February 1957.